Patented Jan. 3, 1950

2,493,072

UNITED STATES PATENT OFFICE 2,493,072

PRODUCTION OF IMPROVED THIOINDIGO PIGMENTS

Donald Bernard Killian, Newark, N. J., assignor to E. I. du Pont de Nemours & Company, Wilmington, Del., a corporation of Delaware No Drawing. Application March 7, 1947, Serial No. 733,200

7 Claims. (Cl. 260—332)

This invention relates to an improved process for producing thioindigo coloring matters and to the products obtained thereby.

It is an object of this invention to improve the process of manufacturing certain types of thioindigo colors, whereby the same may be obtained in a form having superior tinctorial qualities to those obtained by hitherto known methods. Other and further objects of this invention will appear as the description proceeds.

Thionaphthen indigo dyestuffs and pigments, hereinafter called thioindigo coloring matters, have been in commerce for many years as textile dyes. This class of dyestuff covers a wide shade range and, from the viewpoint of chemical structure, comprises 2:2'-bisthionaphthenindigo (Colour Index #1207) and its substitution products. A number of red and maroon thioindigo colors have gained wide usage in the pigment field in recent years, particularly in the formulation of durable automotive finishes and other paints where good durability and light-fastness are required.

Several convenient methods for synthesis of thioindigo dyes are known in the art, one of the most important comprising ring-closure of an appropriate phenyl-thioglycollic acid in a strongly dehydrating mineral acid, such as oleum or chlorosulfonic acid, to the corresponding thioindoxyl, followed by oxidation in situ to the thioindigo, as described for instance by Schmidt and Bryk in U. S. Patents Nos. 916,029 and 916,030. For example, ring-closure and oxidation of 2-methyl-4-chlorophenyl thioglycollic acid to the corresponding 5:5' - dichloro - 7:7' - dimethyl thioindigo occurs readily in cold chlorosulfonic acid, and the resultant pigment dyestuff is a maroon pigment of considerable commercial value. I have now found that addition of organic mercaptans or disulfides to the chlorosulfonic acid, prior to ring-closure and oxidation of a phenyl - thioglycollic acid to the corresponding thioindigo, gives pigments of valuable and unexpectedly superior tinctorial properties compared to the same colors made without the added organic mercaptan or its derivatives.

Accordingly, my invention comprises a process for producing thioindigo coloring matters by subjecting a phenyl-thioglycollic acid to ring-closure and oxidation in a strongly mineral acid having oxidative properties, such as sulfuric acid, oleum or chlorosulfonic acid, the reaction mass containing further an organic mercaptan or its equivalent such as the corresponding disulfide. More particularly, in the preferred practice of my invention, a phenyl-thioglycollic acid is added with good agitation to a solution or mixture of an organic mercaptan in chlorosulfonic acid at a temperature high enough for reaction to the thioindigo but below that temperature where sulfonation of the resultant dyestuff or its intermediates would occur. The optimum temperature and reaction time vary from case to case depending upon the nature of the phenyl-thioglycollic acid selected as initial material.

When the phenyl-thioglycollic acid is condensed to the corresponding thioindoxyl, and when the latter is oxidized to the corresponding thioindigo, water is evolved as a by-product in the reaction. The water in turn reacts with the chlorosulfonic acid to yield sulfuric acid and hydrogen chloride gas. Sulfur dioxide is also evolved during the oxidation phase of the reaction. Thioindigo formation is complete when no more hydrogen chloride and sulfur dioxide are evolved. At this stage in the process, the dyestuff is dissolved in the mixture of chlorosulfonic acid and sulfuric acid resulting from the reaction. The pigment color is obtained by drowning the above solution in water by any of the methods known to the art, and preferably by the turbulent-flow process described in Detrick and Brandt, U. S. P. 2,334,812. The precipitated pigment is filtered, washed, and may be dried or kept as press-cake pulp. The resultant colors when dispersed in a lithographic varnish, or paint vehicle, by conventional means are stronger and more intense, and different in shade than similar pigments prepared without the mercaptan.

As typical or commercially convenient phenyl-thioglycollic acids for use in my invention, may be mentioned: 4-chloro-phenyl-thioglycollic acid; 3:4-dichloro-phenyl-thioglycollic acid; 2-methyl-4 - chloro - phenyl - thioglycollic acid; 2 - methyl-3-chloro-phenyl-thioglycollic acid; 2:3-dimethyl-chloro-phenyl-thioglycollic acid; 2:4:5-trichloro-phenyl - thioglycollic acid; 2 - methyl-4-bromo-phenyl - thioglycollic acid; 2 - methyl - 4 - nitro-phenyl-thioglycollic acid.

As suitable organic mercaptans usable in the novel process, may be named: n-butyl mercaptan; iso-butyl mercaptan; n-amyl mercaptan; n-octyl mercaptan; n-dodecyl mercaptan; pinene mercaptan; trichloro - thiophenol; 3:4 - dimethyl-phenyl mercaptan; 2:4 - dimethyl - phenyl mercaptan; 3-mercaptobenzoic acid; 4-mercaptobenzoic acid; 2-mercaptobenzoic acid.

In summary, it seems that any alkyl, aryl or terpene mercaptan or any compound which results from such a mercaptan when the latter is subjected to mild oxidizing conditions in an acid medium, for instance the corresponding disulfide, is suitable for my invention. As the above list shows, the initial mercaptan may be of an aliphatic, aromatic or terpene nature, and it may carry inert substituents such as halogen or lower alkyl. Of special interest, however, are those compounds which contain water-solubilizing or alkali - solubilizing groups, as typified by the mercapto-benzoic acids above named; for in this instance, the mercaptan or its resultant acid-oxidization product is readily washed out of the final pigment by treatment with water or dilute alkali.

The invention will now be illustrated in detail by the following specific examples, which however are not to be construed in a limiting sense. Parts mentioned are by weight.

*Example 1*

A four-neck flask, equipped with an agitator, thermometer, calcium chloride drying tube, and charging funnel is charged with 315 parts of chlorosulfonic acid. The agitator is started, and the flask contents cooled to 0–5° C. externally, by immersing the flask in an ice bath. A solution of 5 parts of n-dodecyl mercaptan in 80 parts of carbon tetrachloride is added slowly, and the solution is stirred to a temperature of 5° C. Thereafter, 100 parts of commercial-grade, 2-methyl-4-chloro-phenyl-thioglycollic acid (prepared by the method of Schmidt and Bryk U. S. P. 916,029) are added in about 10 equal portions over a period of 30 to 45 minutes. After each addition of the phenyl-thioglycollic acid, the temperature in the flask rises to 10–12° C.; stirring is continued after each such addition (of intermediate) until the temperature drops to 5–8° C. before addition of the next portion. When all the 2-methyl-4-chloro-phenyl-thioglycollic acid is added, the charging port is closed, and the solution is stirred for one hour permitting the temperature to rise gradually to 12° C. in that time. Vigorous evolution of hydrogen chloride and sulfur dioxide occurs during the charging and reaction cycles. Thereafter, stirring is continued for 3 hours until no more hydrogen chloride is evolved from the reaction. During this time the temperature is permitted to rise to 17–20° C. The resultant product is a dark green solution of dyestuff in a mixture of chlorosulfonic acid and sulfuric acid (the latter having been formed by hydrolysis of chlorosulfonic acid with the water evolved in the reaction).

The above dyestuff solution is drowned in water under conditions of high turbulence, using the method of the Detrick and Brandt U. S. Patent 2,334,812. The coloring matter, 5:5'-dichloro-7:7'-dimethyl-2:2'-bisthionaphthenindigo, is precipitated as a dark red or maroon pigment. The thioindigo pigment slurry is filtered, washed acid-free, reslurried in 2% caustic soda, and heated to 80–90° C. for one hour adding a dilute sodium hypochlorite solution, as required, to maintain a slight excess of hypochlorite ion in solution. The extracted pigment is filtered, washed alkaline-free, and dried at 60° C. The dried color is a bright maroon powder.

In one of my experiments as above, I made a control run exactly as in the above procedure, but omitting the n-dodecyl mercaptan from the reaction.

The two products were dispersed in an alkyd enamel by conventional means both in full shades and extended with a prime white pigment such as antimony oxide or titanium dioxide. The enamels were sprayed on steel panels to give a film sufficiently thick for complete hiding, and air dried for one day. Tinctorial comparison of the dried panels showed the pigment made with n-dodecyl mercaptan to be intense and very light in masstone, and intense, yellow and strong in tint compared with the control sample made without the n-dodecyl mercaptan.

*Example 2*

The process of Example 1 is followed except using a purified form of 2-methyl-4-chlorophenyl-thioglycollic acid made by the process referred to in Example 1, and purified by solution in dilute sodium carbonate followed by treatment with decolorizing charcoal, filtration, reprecipitation of the acid in the clarified filtrate with dilute mineral acid, filtering, washing, and drying. The resultant thioindigo pigment compared in an alkyd enamel system to a control product made from the same purified 2-methyl-4-chloro-phenyl-thioglycollic acid is very light and intense in masstone and very yellow, strong and intense in tint compared with the latter.

Analysis of the pigment made with n-dodecyl mercaptan for sulfur and chlorine gave 16.29% sulfur and 17.20% chlorine. The control sample made without mercaptan analyzed 16.13% sulfur and 17.71% chlorine. These results indicate that part, if not all, of the n-dodecyl mercaptan is retained in the final pigment, most likely in the form of an insoluble di-dodecyl disulfide or a derivative thereof.

If the above process is repeated using only 2.5 parts n-dodecyl mercaptan per 100 parts of purified 2-methyl-4-chloro-phenyl-thioglycollic acid, a pigment is obtained intermediate in masstone depth in enamel between the one made with 5% n-dodecyl mercaptan and the control product made without mercaptan. However, the tint of the pigment made with the lower amount of the mercaptan is intense, yellow and strong compared with the control sample made without mercaptan.

*Example 3*

The reaction flask of Example 1 is charged with 612 parts of chlorosulfonic acid, and 10 parts of 3-mercapto-benzoic acid. The mixture is stirred and cooled to 5° C. Thereafter, 200 parts of purified 2-methyl-4-chloro-phenyl-thioglycollic acid of Example 2 are charged in small portions so that the temperature of the reaction mixture does not rise above 12° C. Thereafter, the reaction is finished and the pigment precipitated by drowning in water as described in Example 1. In one of my experiments, a control sample, run in the same way but without 3-mercapto-benzoic acid, was also made.

The finished pigments were dispersed in lithographic varnish or an alkyd enamel, and compared tinctorially. The product made with 3-mercapto-benzoic acid was very intense and light in masstone and yellow, strong and intense in tint compared with the control sample made without the mercapto-benzoic acid.

Analysis of the two pigments above for sulfur and chlorine gave the following results:

| Sample | Per Cent S | Per Cent Cl |
|---|---|---|
| Made with 3-mercapto-benzoic acid | 16.11 | 17.94 |
| Made without 3-mercapto-benzoic acid | 16.13 | 17.71 |

These results indicate that most, if not all, the 3-mercapto-benzoic acid is removed from the finished pigment during the washing and alkaline extraction steps in the process.

*Example 4*

A reaction flask equipped as described in Example 1 is charged with 150 parts of chlorosulfonic acid, 32 parts of carbon tetrachloride, and 1 part of n-dodecyl mercaptan. The resultant solution is cooled externally to 0–5° C. and 30 parts of 3:4-dichloro-phenyl-thioglycollic acid prepared by the method of German Patent 241,910 are added at such a rate as to keep the temperature at 12° C. or lower. Thereafter, the reaction is finished, and the pigment precipitated as described in Example 1. The product, 5:6:5':6'-tetrachloro 2:2'-bisthionaphthenindigo, is filtered and alkaline extracted in the presence of excess sodium hypochlorite by the method of Example 1.

In one of my experiments, a control sample was made in the same way but without addition of n-dodecyl mercaptan to the reaction mass. The two above pigments were dispersed in alkyd enamel, and compared tinctorially. The pigment made with n-dodecyl mercaptan was superior tinctorially to the control made without mercaptan, and different from any obtainable heretofore without use of the mercaptan.

*Example 5*

A reaction flask equipped as described in Example 1 was charged with 2400 parts of chlorosulfonic acid. The contents were cooled externally to 0–5° C., then 40 parts of n-dodecyl mercaptan were added. Thereafter, 800 parts of 2:5-dimethyl-4-chloro-phenyl-thioglycollic acid, prepared by the method of Schmidt and Bryk U. S. P. 916,030, were added in small portions at such a rate that the temperature of the reaction mixture did not rise above 2° C. The temperature was kept below 2° C. for six hours. The mass was warmed to 30° C. over a six hour period and held there for an additional six hours. The bright green dyestuff solution so obtained was drowned as in Example 1.

The resultant color when compared in alkyd enamel to the pigment made in the same way without addition of the organic mercaptan was lighter and tinctorially brighter.

*Example 6*

150 parts of purified 2-methyl-4-chloro-phenyl-thioglycollic acid were added to a mixture of 450 parts of chlorosulfonic acid and 3.75 parts of 3-mercapto-benzoic acid at 8–12° C. The reaction mixture was warmed to 20° C. over a one and one-half hour period and held at 17–20° C. for three hours. The mass was drowned in a turbulent drowning tube with 55° C. water at such a rate that a temperature rise of 5° C. was obtained. The color was filtered off and washed acid-free to Congo red paper. Approximately ¼ of the cake was stirred for one hour at 80–90° C. in 3 liters of water and 50 cc. of 30% sodium hydroxide solution. The color was filtered off, washed alkali free to Brilliant Yellow paper, and dried at 60–65° C. When tested in alkyd enamel this pigment was light and bright in masstone and yellow and bright in tint compared to a control sample which was prepared in a similar manner but without the use of the 3-mercapto-benzoic acid.

*Example 7*

An apparatus as in Example 1 was charged with 160 parts of chlorosulfonic acid. The agitator was started, and the flask contents were cooled to 0–5° C. externally by immersing the flask in an ice bath. While stirring, 2.5 parts of diphenyl disulfide were added slowly. Thereafter 50 parts of purified 2-methyl-4-chloro-phenyl thioglycollic acid were added in about 10 equal portions over a period of 30 to 45 minutes. After each such addition, stirring was continued until the temperature dropped back to 5–8° C. When all the phenyl thioglycollic acid was in, the charging port was stoppered, and the solution was stirred for one hour permitting the temperature to rise gradually to 12° C. Vigorous evolution of hydrogen chloride and sulfur dioxide occurred. Thereafter, stirring was continued for 3 hours while permitting the temperature to rise to 17–20° C.

The resultant product was a dark green solution of dyestuff in a mixture of chlorosulfonic acid and sulfuric acid (formed in the reaction). This solution was drowned in water under conditions of high turbulence, using the method of Detrick and Brandt U. S. Patent 2,334,812. The dyestuff, 5:5'-dichloro-7:7'-dimethyl-2:2'-bis-thionaphthen indigo was precipitated as a dark red or maroon pigment. The thioindigo pigment slurry was filtered, washed acid-free, reslurried in 2% caustic soda, and heated to 80–90° C. for one hour adding a dilute sodium hypochlorite solution as required to maintain a slight excess of hypochlorite ion in solution. The extracted pigment was filtered, washed alkali-free, and dried at 60–80° C. The dried color was a bright maroon powder.

A control run was made exactly as in the above procedure, but omitting the diphenyl disulfide from the reaction.

The two products were dispersed in an alkyd enamel and tested for their tinctorial properties as in Example 1. The comparison showed the pigment made when using diphenyl disulfide to be intense and very light in masstone, and intense, yellow, and strong in tint compared to the control sample made without the diphenyl disulfide.

*Example 8*

The process of Example 7 was repeated except using 160 parts of 20% oleum in place of the chlorosulfonic acid, and 2.5 parts n-dodecyl mercaptan in place of the diphenyl disulfide. The resultant thioindigo pigment compared in an alkyd enamel system to a control product made without n-dodecyl mercaptan was very light and intense in masstone, and very yellow, strong, and intense in tint.

*Example 9*

The process of Example 7 was repeated using 2.5 parts of trichloro-thiophenol in place of the diphenyl disulfide. The trichloro-thiophenol employed for this purpose was prepared by reacting 1,2,4-trichlorobenzene with chlorosulfonic acid and reducing the resulting trichloro-benzene-sulfonyl chloride to the mercapto stage by the aid of zinc and sulfuric acid.

A control sample made in the same way without the trichloro-thiophenol was also made. The resultant thioindigo pigments when compared in an alkyd enamel system showed the product made with trichloro-thiophenol to be very intense and light in masstone, and yellow, strong and intense in tint compared to the control sample made without the trichloro-thiophenol.

It will be clear that the above examples are merely illustrative, and that the details of procedure may be varied within wide limits. Thus, the conditions for ring-closure of the selected phenyl-thioglycollic acid, and oxidation of the resultant thioindoxyl to a pigment may vary considerably in optimum temperature for the reaction, time of reaction, and in the ratio of the phenyl-thioglycollic acid to the dehydrating mineral acid used, as illustrated in the six preceding examples above. Likewise, the choice of reaction medium, and dehydrating acid used may be varied, depending on the nature of the phenyl-thioglycollic acid started with. For instance, some substituted phenyl-thioglycollic acids may be satisfactorily reacted with strong sulfuric acid, others with mixtures of sulfuric acid and chlorosulfonic acid, and others in straight chlorosulfonic acid or oleum. Also, it may be preferred in some cases to oxidize the thioindoxyl intermediate in a separate reaction either before or after separation from the mineral acid in which it was formed. All such variations are, however, well known to those skilled in this art, and are within the spirit and scope of this invention.

In place of the organic mercaptans mentioned above for use in the process of this invention, the corresponding disulfides may be employed. The choice between the two types of agent will generally be determined by the ease of preparation or more ready availability of one type or the other. The mercaptans or their equivalent disulfides may be added to the reaction mass in amounts varying from 1 to 20% by weight of the entering phenyl-thioglycollic acid, but the preferred proportions are from 2 to 10%.

The mechanism of the reaction whereby the organic mercaptans operate in the synthesis of thioindigo pigments as described above to yield tinctorially different and more valuable thioindigo pigments is not understood. However, while I do not wish to be bound to any theory of reaction mechanism, observation of the reaction indicates that a more rapid ring-closure and oxidation of a phenyl-thioglycollic occurs in the presence of an organic mercaptan, which facts suggest that the latter compounds may function as oxidation promoters in the reaction.

The advantages and merits of my invention will now be readily apparent. Preparation of thioindigo pigments by the processes heretofore known to the art gives, in the case of any specified thioindigo, made under controlled conditions, a product of definite tinctorial properties such as masstone, shade and strength in paints, plastics, lithographic inks, etc., which properties cannot be altered significantly by customary variations in the process. The process of this invention provides unexpected, novel and different pigments in their tinctorial properties which properties have not been obtained in prior art processes. Thus, 5:5'-dichlor-7:7'-dimethyl-2:2'-bisthionaphthenindigo prepared by the usual process known in the art without addition of an organic mercaptan is a maroon pigment, of a rather bluish red shade in tint, and somewhat dull both in full shade and tint when dispersed in systems such as plastics, lithographic inks, and paints. But the same pigment when prepared in the presence of an organic mercaptan is a brighter, yellower, and more desirable maroon in both masstone and tint and moreover possesses greater tinting strength than the pigment made without mercaptan. These improved properties are valuable and highly desirable, and have heretofore been unobtainable with this color by known processes.

This invention, therefore, provides a simple and readily applicable means of altering the tinctorial properties of thioindigo pigments from those obtainable heretofore. The products of this invention are novel, and more desirable tinctorially than those from prior art processes, and, furthermore, are valuable commercially.

The pigments to which this invention relates are applicable widely in the arts for coloration of plastics, paper, leather, textiles, paints, and in the lithographic arts.

I claim as my invention:

1. In the process of preparing a thioindigo coloring matter by reacting with a dehydrating and oxidizing mineral acid upon a phenyl-thioglycollic acid, the improvement which consists in effecting the reaction in the presence of a compound selected from the group consisting of organic mercaptans and disulfides.

2. In the process of preparing a thioindigo coloring matter by successive ring-closure and oxidation of a phenyl-thioglycollic acid by the aid of chlorosulfonic acid, the improvement which consists in effecting the reaction in the presence of an organic mercaptan.

3. In the process of preparing a thioindigo coloring matter by reacting with a dehydrating and oxidizing mineral acid upon a phenyl-thioglycollic acid, the improvement which consists in effecting the reaction in the presence of an organic mercaptan which carries a water-solubilizing radical.

4. In the process of preparing a thioindigo coloring matter by reacting with a dehydrating and oxidizing mineral acid upon a phenyl-thioglycollic acid, the improvement which consists in effecting the reaction in the presence of an organic mercaptan possessing a COOH group.

5. The process of preparing 5:5'-dichloro-7:7'-dimethyl-2:2'-bisthionaphthenindigo, which comprises reacting with chlorosulfonic acid upon 2-methyl-4-chloro-phenyl thioglycollic acid in the presence of an alkyl mercaptan.

6. The process of preparing 5:5'-dichloro-7:7'-dimethyl-2:2'-bisthionaphthenindigo, which comprises reacting with chlorosulfonic acid upon 2-methyl-4-chloro-phenyl thioglycollic acid in the presence of a dimethyl-phenyl mercaptan.

7. The process of preparing 5:5'-dichloro-7:7'-dimethyl-2:2'-bisthionaphthenindigo, which comprises reacting with chlorosulfonic acid upon 2-methyl-4-chloro-phenyl thioglycollic acid in the presence of a mercapto-benzoic acid.

DONALD BERNARD KILLIAN.

REFERENCES CITED

The following references are of record in the file of this patent:

UNITED STATES PATENTS

| Number | Name | Date |
| --- | --- | --- |
| 916,030 | Schmidt | Mar. 23, 1909 |
| 2,176,011 | Murch et al. | Oct. 10, 1939 |